(12) United States Patent
Hironaka et al.

(10) Patent No.: US 6,248,814 B1
(45) Date of Patent: Jun. 19, 2001

(54) RESIN COMPOSITION

(75) Inventors: Katsuhiko Hironaka; Mioko Suzuki, both of Chiba (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/424,678

(22) PCT Filed: Mar. 16, 1999

(86) PCT No.: PCT/JP99/01290

§ 371 Date: Nov. 24, 1999

§ 102(e) Date: Nov. 24, 1999

(87) PCT Pub. No.: WO99/48979

PCT Pub. Date: Sep. 30, 1999

(30) Foreign Application Priority Data

Mar. 25, 1998 (JP) .................................................. 10-077532

(51) Int. Cl.⁷ ................................ C08K 3/22; C08K 3/38
(52) U.S. Cl. ............................ 524/80; 524/405; 524/434
(58) Field of Search ..................................... 524/405, 127, 524/145, 80, 434, 605

(56) References Cited

U.S. PATENT DOCUMENTS

| | | | |
|---|---|---|---|
| 3,671,487 | * 6/1972 | Abolins ................ | 524/434 |
| 3,810,861 | * 5/1974 | Tacke et al. ......... | 524/434 |
| 3,829,400 | * 8/1974 | Kato et al. .......... | 524/434 |
| 4,000,109 | * 12/1976 | Smith et al. ......... | 524/405 |
| 4,044,072 | * 8/1977 | Touval ................ | 524/434 |
| 4,257,931 | * 3/1981 | Granzow ............. | 524/605 |
| 4,493,913 | * 1/1985 | Hirobe et al. ....... | 524/80 |
| 4,921,896 | * 5/1990 | Bonin et al. ........ | 524/80 |
| 5,041,490 | * 8/1991 | Sakon et al. ........ | 524/80 |
| 5,135,971 | * 8/1992 | Steiert et al. ....... | 524/80 |
| 5,278,212 | * 1/1994 | Nishihara et al. .... | 524/145 |
| 5,278,218 | * 1/1994 | Carette et al. ...... | 524/434 |
| 5,338,791 | * 8/1994 | Chaplin .............. | 524/405 |
| 5,466,741 | * 11/1995 | Bonin et al. ........ | 524/405 |
| 5,472,644 | * 12/1995 | Schubert ............. | 524/405 |
| 5,681,879 | * 10/1997 | Yamamoto et al. ... | 524/386 |
| 5,726,231 | * 3/1998 | Namiki et al. ....... | 524/434 |
| 5,965,639 | * 10/1999 | Yamauchi et al. .... | 524/80 |
| 6,043,306 | * 3/2000 | Imahashi et al. ..... | 524/436 |
| 6,150,447 | * 11/2000 | Cusack et al. ....... | 524/436 |

FOREIGN PATENT DOCUMENTS

| | | |
|---|---|---|
| 51-150553 | 12/1976 | (JP) . |
| 52-8062 | 1/1977 | (JP) . |
| 52-112651 | 9/1977 | (JP) . |
| 52-136243 | 11/1977 | (JP) . |
| 53-86743 | 7/1978 | (JP) . |
| 63-346 | 1/1988 | (JP) . |
| 63-110254 | 5/1988 | (JP) . |
| 1-104687 | 4/1989 | (JP) . |
| 1-132645 | 5/1989 | (JP) . |
| 4-106140 | 4/1992 | (JP) . |
| 5-509122 | 12/1993 | (JP) . |
| 6-9863 | 1/1994 | (JP) . |
| 6-145504 | 5/1994 | (JP) . |

* cited by examiner

*Primary Examiner*—Veronica P. Hoke
(74) *Attorney, Agent, or Firm*—Sughrue, Mion, Zinn, Macpeak & Seas, PLLC

(57) ABSTRACT

An aromatic polyester resin composition excellent in heat resistance, mechanical characteristics, flame retardant property and electric insulation property, and mainly used in electric/electronic uses is obtained by a resin composition comprising (A) an aromatic polyester of 100 parts weight, (B) red phosphorus and/or organic phosphorus compound of 1 to 20 parts weight based on phosphorus atom content and (C) at least one kind selected from a group consisting of zinc borate, zinc stannate and zinc oxide of 2 to 50 parts weight.

7 Claims, No Drawings

RESIN COMPOSITION

TECHNICAL FIELD

The present invention relates to a resin composition, and more particularly relates to an aromatic polyester resin composition having an excellent flame retardant property and electric insulation property.

BACKGROUND ART

The engineering plastics are excellent in mechanical characteristics, heat resistance and molding processability, and their utilization are expanding in the fields of automobile parts, machinery parts and electric/electronic parts.

In the electric/electronic field, since a safety in use, a production efficiency and the utilization of recycled resources are required, while a process of making the parts thereof as having a light weight, thin thickness, short length and small size, and also having a high performance is progressing, the engineering plastics, particularly the aromatic polyester as a central figure, which is excellent in heat resistance, molding processability and chemical resistance and relatively easy for making it of flame retardant, are extending their range of uses.

As to the method for making the engineering plastics of flame retardant, a technology for blending a red phosphorus and a zinc compound such as zinc borate, etc., with a polyamide was disclosed in the Japanese unexamined patent publication 6-145504. Although the polyamide itself has an excellent tracking resistance, the changes in electrical and mechanical characteristics caused by the absorption of moisture are large. And it is known that the flame retardant property of the polyamide is increased by an interaction between phosphorus atom and nitrogen atom in the polymer skeleton of the polyamide. Therefore the technologies for aiming at the method for making the polyamide of flame retardant are known besides the above Japanese unexamined patent publication 6-145504.

On the other hand, the aromatic polyester is widely used as the electric/electronic parts. In this case, it is made of flame retardant by blending an organic halogenous compound therewith in most of the cases for increasing the safety for a fire of the product composed of the molded product thereof.

DISCLOSURE OF THE INVENTION

The tracking resistance is one of the measures of the electric insulation, The tracking resistance is good in the aromatic polyester itself, but reduced markedly by blending the organic halogenous compound with the aromatic polyester for making the same of flame retardant. Therefore, although the aromatic polyester composition is made of flame retardant, there is an issue of an increased risk of a fire because of the lack of the tracking resistance.

Since there is no interaction of phosphorus atom in a flame retardant agent with nitrogen atom in the polymer skeleton of the aromatic polyester as in the case of the polyamide, it is more difficult to make the polyester of flame retardant as compared with the case of the polyamide. In order to impart a similar degree of the flame retardant property, it is necessary to add a larger amount of the phosphorus compound, however, the addition of the large amount of the phosphorus compound to the polyester resin brings not only the reduction of the tracking resistance but also the reduction of the mechanical characteristics and the molding processability.

The present invention is accomplished in the above mentioned circumstance as a background.

The objective of the present invention is to provide a polyester resin composition excellent in flame retardant property and electrical insulation property, and especially, the flame retardant polyester resin composition capable of being suitably used in electric/electronic uses, showing less change of the characteristics in absorbing moisture, excellent in flame retardant property, and equipped with a high tracking resistance.

The other objects and advantages of the present invention will be clarified from the following explanations.

The present invention is composed of the following constitutions.

1. A resin composition comprising (A) an aromatic polyester of 100 parts weight, (B) red phosphorus and/or an organic phosphorus compound of 1 to 20 parts weight based on a phosphorus atom content and (C) at least one kind of compound of 2 to 50 parts weight selected from a group consisting of zinc borate, zinc stannate and zinc oxide.
2. A resin composition comprising (A) an aromatic polyester of 100 parts weight, (B) red phosphorus and/or an organic phosphorus compound of 1 to 20 parts weight based on a phosphorus atom content, (C) at least one kind of compound of 2 to 50 parts weight selected from a group consisting of zinc borate, zinc stannate and zinc oxide and (D) an inorganic filler, in which the total of the components (C) and (D) is 25 to 60 weight percent based on the total amount of the composition.

The present invention is explained in detail as follows.

((Aromatic Polyester (A)))

The aromatic polyester (A) used in the present invention, is a polyester using an aromatic dicarboxylic acid as a dicarboxylic acid component and an aliphatic diol as a diol component.

As the dicarboxylic component, terephthalic acid, isophthalic acid, phthalic acid; a phthalic acid derivative such as methyl terephthalate, methyl isophthalate, etc.; and a naphthalene dicarboxylic acid such as 2,6-naphthalene dicarboxylic acid, 2,7-naphthalene dicarboxylic acid, 1,5-naphthalene dicarboxylic acid and their derivatives can be cited as examples.

As the diol component, an aliphatic diol such as ethylene glycol, propylene glycol, tetramethylene glycol, hexamethylene glycol, neopentyl glycol, etc., can be cited as examples.

As the aromatic polyester (A), a polytetramethylene terephtahlate, a polyethylene terephthalate and a polytetramethylene-2,6-naphthalene dicarboxylate are preferable since they are excellent in heat resistance, chemical resistance and molding processability.

The aromatic polyester (A) is allowed to be substituted by for example 40 mol % or less, preferably 30 mol % or less and more preferably 20 mol % or less of a copolymerizable component based on the total carboxylic acid components or the total diol components.

As the copolymerizable component, among the above mentioned dicarboxylic components and diol components, a dicarboxylic acid and a diol component besides those used as the main components, can be used.

As the copolymerizable dicarboxylic acid component, concretely, isophthalic acid, phthalic acid; a phthalic acid derivative such as methyl terephthalate, methyl isophthalate, etc.; and a naphthalene dicarboxylic acid such as 2,7-naphthalene dicarboxylic acid, 1,5-naphthalene dicarboxylic acid and their derivatives; a diphenyl dicarboxylic acid such as 4,4'-diphenyl dicarboxylic acid, 3,4'-diphenyl dicarboxylic acid, etc., and their derivatives; an aromatic dicarboxylic acid such as 4,4'-diphenoxymethane dicarboxylic acid, 4,4'-diphenoxyethane dicarboxylic acid, etc.; an aliphatic dicarboxylic acid such as succinic acid, adipic acid, sebacic acid, azelaic acid, decane dicarboxylic acid, etc.; and an alicyclic dicarboxylic acid such as cyclohexane dicarboxylic acid, can be cited as examples, and as the copolymerizable diol components, concretely, an alicyclic diol such as 1,4-cyclohexane dimethanol, etc.; a dihydroxybenzene such as hydroquinone, resorcin, etc. and their derivatives; a bisphenol compound such as 2,2-bis(4-hydroxyphenyl)propane, 2,2-bis(4-hydroxyphenyl)sulfone, etc.; and an aromatic diol such as an ether diol obtained from a bisphenol compound with a glycol such as ethylene glycol, can be cited as examples. Besides these, it is possible to copolymerize an oxycarboxylic acid, and as the oxycarboxylic acid, ε-oxycaproic acid, hydroxybenzoic acid and hydroxyethoxybenzoic acid can be cited as examples.

In the aromatic polyester (A) a branching component can be copolymerized. As the branching component, for example a 3 functional or 4 functional acid having an ester forming function such as tricarballylic acid, trimesic acid, trimellitic acid, etc.; and a 3 functional or 4 functional alcohol having an ester forming function such as glycerol, trimethylolpropane, pentaerythrite, etc., can be cited as examples. When the branching component is copolymerized, their amounts for the coplymerization are 1.0 mol % or less, preferably 0.5 mol % or less, and more preferably 0.3 mol % or less based on the total dicarboxylic acid components.

The aromatic polyester (A) can be used by combining 2 kinds or more of them.

The aromatic polyester (A) has an intrinsic viscosity of 0.5 or more measured at 35° C. by using o-chlorophenol, and those having the intrinsic viscosity of 0.6 to 1.2 are preferable in a balance of the mechanical characteristics and the molding processability.

The aromatic polyester used in the present invention can be produced by a usual production method, for example a melt polycondensation reaction or a method of combining the same reaction with a solid phase polycondensation reaction.

By taking a polytetramethylene terephthalate as an example, the method of production thereof is explained. The polytetramethylene terephthalate can be produced by a method of heating for reacting terephthalic acid or its ester forming derivative (for example, a lower alkyl ester such as dimethyl ester, monomethyl ester, etc.) with tetramethylene glycol or its ester forming derivative in the presence of a catalyst to obtain a glycol ester of terephthalic acid, and then subjecting the same ester to a polymerization reaction up to a prescribed degree of polymerization.

((Red Phosphorus and/or Organic Phosphorus Compound (B)))

In the present invention, red phosphorus and/or an organic phosphorus compound as the (B) component, is blended as a compound for making the composition of flame retardant. Since the molding process temperature of the aromatic polyester is relatively high, as the (B) component, red phosphorus or a phosphoric acid ester containing an aromatic ring, which has a relatively high heat resistance is preferable, and red phosphorus not exhibiting a bleed out in the composition, is especially preferable.

In the case of using red phosphorus as the (B) component, it is preferable to use a coated red phosphorus powder having a cured resin coating. Using red phosphorus without having the coating alone, is not preferable since there are risks of an ignition and a phosphine generation caused by a high temperature or a mechanical shock.

As the curable resin used as the coating of the coated red phosphorus, a phenol resin, an epoxy resin, an unsaturated polyester resin, a melamine resin, a urea resin, an aniline resin and a silicone resin are preferable.

The coated red phosphorus powder coated with the cured resin is allowed to contain by dispersing at least one kind of inorganic compound selected from a group consisting of aluminum hydroxide, magnesium hydroxide, zinc hydroxide and titanium hydroxide in the cured resin used for the coating, and further to have at least one kind of a coating selected from aluminum hydroxide, magnesium hydroxide, zinc hydroxide and titanium hydroxide under the cured resin coating by making a contact with red phosphorus.

The mean particle diameter of the coated red phosphorus powder (B) is preferably in a range of 5 to 40 μm, more preferably in a range of 25 to 35 μm. If the mean particle diameter is less than 5 μm, then it is not preferable in the view of the uniformity of dispersion thereof, and if it exceeds 40 μm, it is also not preferable since the mechanical characteristics and flame retardant property thereof are reduced.

As red phosphorus in the coated red phosphorus powder (B) is preferably an essentially spherical red phosphorus obtained directly by a conversion treatment method of yellow phosphorus and without having crushed surfaces. By using such red phosphorus, the surfaces are extremely stabilized to increase the stability of red phosphorus, and the stability of the composition becomes good to inhibit the generation of phosphine.

On the other hand, in the case of using red phosphorus other than the essentially spherical red phosphorus, that is, red phosphorus obtained as aggregates by heat treating yellow phosphorus for several days in a reaction vessel of a so-called conversion pot, and then pulverized by a crushing process, it is not preferable since there are following problems. These are, by the pulverization, many active points are produced on the surfaces of the particles of the red phosphorus, and therefore it is not preferable since the red phosphorus becomes liable to react with oxygen or water molecule to become a cause of an ignition, and the generation of phosphine and oxidized products.

As a method for producing the essentially spherical red phosphorus for the coated red phosphorus powder (B), the following method can be cited as an example. That is, yellow phosphorus is heated up to a temperature in the vicinity of boiling point thereof for initiating the conversion reaction to red phosphorus in a hermetically closed vessel substituted with an inert gas, Then, the reaction is stopped when the conversion rate or the particle diameter of the red phosphorus attains a prescribed level, and the unconverted yellow phosphorus is distilled off. By this method, an amorphous red phosphorus consisting of fine essentially spherical particles not requiring the pulverization totally, or their associated material is obtained. The conversion rate and the particle diameter of the red phosphorus can be adjusted by the reaction time and reaction temperature. The preferable reaction temperature is 250 to 350° C., and preferable conversion rate is 60% or less.

Although the cured resin-coated red phosphorus powder is markedly improved in a point of safety such as a handling, etc., as compared with red phosphorus alone, it is preferable to use the phosphorus as master pellets obtained by melting and kneading with a thermoplastic resin in advance for ensuring further safety in using the same.

As the thermoplastic resin used in the above case, for example, a polyethylene, a polypropylene, an EPDM, an ethylene-ethyl acrylate copolymer, an ethylene-methyl acrylate copolymer, a polyester, a polyamide and a polycarbonate can be cited as examples.

Usually, it is preferable to use the same component with the aromatic polyester used as the component (A).

The blending amount of the red phosphorus and/or the organic phosphorus compound in the component (B), is 1 to 20 parts weight as phosphorus atom content based on the aromatic polyester (A) of 100 parts weight. If the blending amount is less than 1 part weight, then the obtained flame retardant effect is small, and if it exceeds 20 parts weight, the mechanical characteristics of the resin composition is deteriorated.

((Zinc borate, Zinc stannate and Zinc oxide (C)))

In the present invention, at least one compound selected from a group consisting of zinc borate, zinc stannate and zinc oxide is used as the component (C). The zinc borate, zinc stannate and zinc oxide can be used either by singly or by 2 or more kinds simultaneously, or as a mixture of them.

As the stannate, both of metastannate and hydroxy stannate can be used. All of the zinc borate, zinc stannate and zinc oxide may be hydrated with water molecule. Especially preferable compound as the component (C) is zinc borate and its hydrated compound.

By blending red phosphorus and/or the organic phosphorus compound with the aromatic polyester, it is possible to impart a flame retardant property thereto, and by blending at least one kind of compound selected from a group consisting of zinc borate, zinc stannate and zinc oxide, it is possible to further improve the flame retardant effect, and also to our surprise, it is possible to improve a tracking property thereof.

The blending amount of at least one kind of compound selected from the group consisting of zinc borate, zinc stannate and zinc oxide, is 2 to 50 parts weight based on the aromatic polyester (A) of 100 parts weight. If the blending amount is less than 2 parts weight, the effect of the improvement of the flame retardant property and the tracking resistance is small and if it exceeds 50 parts weight, then the mechanical characteristics of the resin composition are inferior.

((Inorganic Filler (D)))

In the present invention, it is preferable to blend an inorganic filler (D). In the case of blending the inorganic filler (D), it is preferable to use 25 to 60 weight %, preferably 30 to 55 weight % as the total amount of components (C) and (D) based on the total amount of the resin composition, and by blending in the above amount ratio, it is effective since the flame retardant efficiency caused by the components (C) and (D) is increased. If the total blending amount of the components (C) and (D) is less than 25 weight %, the flame retardant effect is not sufficiently exhibited, and if it exceeds 60 weight %, it is not preferable since the mechanical characteristics and flow property of the composition become inferior.

As the inorganic filler of the component (D), it is possible to use a filler of a fibrous, a whisker, a particle, a plate and an amorphous state.

Concretely, a reinforcing material such as a glass fiber, a carbon fiber, a steel fiber, an asbestos, a ceramic fiber, a potassium titanate whisker, a boron whisker, aluminum borate, etc.; a silicate-based filler such as a kaolin, clay, wollastonite, talc, mica, etc.; a metal compound such as magnesium hydroxide, cobalt hydroxide, calcium carbonate, barium sulfate, etc., except for the component (C), and a filler such as a silica, an alumina, glass beads, glass flakes, etc., can be cited as examples. Among them a fibrous inorganic filler capable of obtaining a good reinforcing effect in the mechanical characteristics, is preferable, and the glass fiber is especially preferable.

((Tracking Resistance and Flame retardant Property))

The resin composition in the present invention has an excellent flame retardant property and an excellent electric insulation. The resin composition in the present invention can be equipped with a high tracking resistance preferably higher by 100 V or more as compared with that of the conventional aromatic polyester resin composition made of flame retardant in a similar degree by simultaneously using a bromine compound and an antimony compound. Further the tracking resistance is a measured values as a comparative tracking index (CTI) in the IEC standard.

For example, in the case of using a polytetramethylene terephthalate as the aromatic polyester (A), the resin composition in the present invention can exhibit an oxygen index of preferably 25 or higher, more preferably 28 or higher, and also the tracking resistance of 500 V or higher.

For example, in the case of using a polyethylene terephthalate as the aromatic polyester (A), the resin composition in the present invention can exhibit the oxygen index of preferably 25 or higher, further preferably 28 or higher and the tracking resistance of 300 V or higher.

The resin composition in the present invention can be equipped with both such tracking resistance and flame retardant property simultaneously.

((Additive))

To the resin composition in the present invention, an additive such as a stabilizer, a coloring agent, a lubricant, an ultraviolet rays-absorbing agent, an anti-static agent, a pigment, etc., may be added as necessary in an amount capable of exhibiting their effects.

Also, another flame retardant may be added, and as the flame retardant, for example, a halogenated compound such as a brominated polystyrene, brominated polyphenylene ether, brominated bisphenol A-type epoxy resin, brominated acrylic resin, brominated bisphenol A-diglycidyl ether and an oligomer thereof, polycarbonate oligomer produced by using brominated bisphenol A, brominated biphenylether, brominated diphthalimide compound, a dimer, etc., of a chlorinated hexapentadiene, etc., can be cited as examples.

Also, an assistant for the flame retardant can be added, and as the assistant for the flame retardant, and for example, an antimony compound such as antimony trioxide, sodium antimonate, etc.; a metal compound such as boron oxide, iron oxide etc.; and a triazine compound such as melamine cyanulate, etc., can be cited as examples. The flame retardant and the assistant for the flame retardant can be used either singly or simultaneously.

In the case of blending the above flame retardant and the assistant for the flame retardant, their amounts of blending should be in a range capable of inhibiting the reduction of the tracking resistance.

In order to further increase the effect of the flame retardant, a compound capable of inhibiting the dripping down of the molten droplets in combustion may be blended. As such a compound, a polytetrafluoroethylene obtained by an emulsion polymerization and a fumed colloidal silica can be cited as examples.

In order to improve the heat resistance as an objective, an antioxidant or a heat stabilizing agent such as a hindered phenol compound, an aromatic amine compound, an organic phosphorus compound, a sulfur compound, etc., can be added.

In order to improve the stability of a melt viscosity and a hydrolysis resistance, etc., as objectives, various epoxy compound, oxazoline compound, etc., can be added. As the epoxy compound, a bisphenol A type epoxy compound obtained by reacting bisphenol A with epichlorhydrin, an aliphatic glycidyl ether obtained by the reactions of various glycols and glycerol with epichlorhydrin, a novolak type epoxy compound, an aromatic or an aliphatic carboxylic acid type epoxy compound and an alicyclic compound type epoxy compound are preferable. As the oxazoline compound, an aromatic or an aliphatic bisoxazoline, especially such as 2,2'-bis(2-oxazoline) and 2,2'-m-phenylene bis(2-oxazoline), are preferable.

The other thermoplastic resin and thermosetting resin can be added in a range not losing the characteristics of the present invention. As the thermoplastic resin, an aliphatic polyester, a polyamide, a polyphenylene sulfide, a polyphenylene ether, a polycarbonate, a phenoxy resin, a polyethylene and its copolymers, a polypropylene and its copolymers, a polystyrene and its copolymer, an acrylic resin, a fluorine resin and its acrylic copolymer, a polyamide elastomer and a polyester elastomer can be cited as examples. As the thermosetting resin, a phenol resin, a melamine resin, an unsaturated polyester resin and a silicone resin can be cited as examples.

In the case of using a polyethylene terephthalate as the aromatic polyester (A), in order to improve the molding processability thereof, it is effective to add a blending agent for improving crystallinity thereof. As such the blending agent, a known crystal nucleating agent such as a talc, an ionomer, etc., can be used. As a plasticizer, an aliphatic polyester compound, a polyalkylene glycol compound, etc., can be cited as examples. Concretely as the aliphatic polyester compound, a polycaprolactone and its terminal blocked compound and as the polyalkylene glycol compound, a polyethylene glycol and its terminal blocked compound, a copolymer of an aromatic and/or an aliphatic polyester with the polyalkylene glycol, can be cited as examples.

((Method of Production))

In the resin composition in the present invention, it is preferable that these blended components are uniformly dispersed. As the method for blending, optional methods can be used. For example, a method of supplying whole or a part of the blended components to a heated mono- or bi-axial extruder in one unit or as a divided state, homogenizing by melting and kneading, extruding as a wire like state, solidifying by cooling the extruded molten resin and then cutting by a desired length for pelletization, can be used. A method using other blending machine such as a blender, a kneader, a roll, etc., can be applied. And a method by combining these methods or repeating the above methods by plural times for adding the blending components sucessively, is also possible.

To obtain a molded product from the resin composition thus obtained, usually the resin composition is supplied to a molding machine such as an injection molder by keeping the resin composition in a sufficiently dried state and is molded. Also, it is possible to dry-blend the constituting raw materials of the resin composition, and directly charge the blended material into the hopper of the molder and melt and knead in the molder.

EXAMPLES

The present invention is explained in detail by the following examples.

The polytetramethylene terephthalate is sometimes abbreviated as PBT.

The amounts of red phosphorus in Tables 1 and 3, are based on the amount of phosphorus atom content.

The measurements of the various characteristics are based on the following methods.

(1) Mechanical Characteristics

Tensile tests and bending tests are based on the ASTM D638 and ASTM D790 respectively.

(2) Deflection Temperature Under Load (DTUL)

The tests are based on the ASTM D648.

(3) Oxygen Index

The tests are based on the JIS K7201.

(4) Tracking Resistance

Comparative tracking indices (CTI) are measured in accordance with the IEC standard Publ. 112, second edition.

(5) Intrinsic Viscosity Value

Values are measured by using o-chlorophenol as a solvent and the Ostwald viscometer at 35° C.

Examples 1 to 4 and Comparative Examples 1 to 8

Pellets for molding were obtained by mixing a polytetramethylene terephthalate (PBT, made by Teijin Limited) dried at 130° C. for 8 hours with a hot air and having intrinsic viscosity value of 0.88, a glass fiber (a chopped strand having a fiber diameter of 13 μm and fiber length of 3 mm, made by Nippon Electric Glass Co., Ltd.), red phosphorus (essentially spherical red phosphorus powder of which surface is coated by a phenol resin and aluminum hydroxide, obtained by a conversion treatment method of yellow phosphorus, commercial name; NOVAEXCEL 140, made by Rinkagaku Kogyo Co., Ltd.), a zinc stannate (made by Nihon Kagaku Sangyo Co., Ltd.), a zinc borate (commercial name; FIREBREAK290, made by BORAX, Co. Ltd., in the U.S.), a zinc oxide (made by Mitsui Mining and Smelting Co., Ltd.), an aluminum borate (commercial name; ALBORITE PF-08, made by Shikoku Chemical Co., Ltd), a brominated polycarbonate oligomer (commercial name; FG7500, made by Teijin Chemical Co., Ltd.) and antimony trioxide (commercial name; PATOX-M, made by Nihon Seiko Co., Ltd.) in ratios described in Table 1 in a tumbler uniformly in advance, then melting and kneading by using a bi-axial extruder having a screw diameter of each 44 mm with a vent, under a vacuum at a cylinder temperature of 250° C., at a number of a screw rotation of 120 r.p.m. and in an ejection amount of 50 kg/hour, and cooling and cutting the thread ejected from a die.

Then, by using the pellets, molded products for measuring various characteristics were molded by using an injection molder having an injection volume of 5 ounce under a condition of a cylinder temperature of 250° C., a mold temperature of 80° C., an injection pressure of 80 MPa, a cooling time of 12 seconds, and a total molding cycle of 40 seconds.

By using these molded products, various characteristics were measured. The results of them are shown in Table 2. Provided that, each of the compositions shown in Table 1 is expressed by parts weight, and the ratios to the total weight of the composition in weight % are also described in parentheses.

TABLE 1

Unit: part weight [weight % in ( )]

|  | (A) PBT | (B) Red phosphorus | (C) Zinc stannate | (C) Zinc borate | (C) Zinc oxide | Aluminum borate | (D) Glass fiber | Brominated polycarbonate oligpmer | Antimony trioxide |
|---|---|---|---|---|---|---|---|---|---|
| Compaarative Example 1 | 100 (70) | — | — | — | — | — | 43 (30) | — | — |
| Compaarative Example 2 | 100 (67) | 4.5 (3.0) | — | — | — | — | 45 (30) | — | — |
| Compaarative Example 3 | 100 (65.5) | 6.9 (4.5) | — | — | — | — | 46 (30) | — | — |
| Compaarative Example 4 | 100 (64) | 9.3 (6.0) | — | — | — | — | 47 (30) | — | — |
| Compaarative Example 5 | 100 (50) | — | 40 (20) | — | — | — | 60 (30) | — | — |

TABLE 1-continued

| | (A) PBT | (B) Red phosphorus | (C) Zinc stannate | (C) Zinc borate | (C) Zinc oxide | Aluminum borate | (D) Glass fiber | Brominated polycarbonate oligpmer | Antimony trioxide |
|---|---|---|---|---|---|---|---|---|---|
| | | | | | | | Unit: part weight [weight % in ( )] | | |
| Compaarative Example 6 | 100 (50) | — | — | 40 (20) | — | — | 60 (30) | — | — |
| Example 1 | 100 (60.5) | 7.4 (4.5) | 8.3 (5.0) | — | — | — | 50 (30) | — | — |
| Example 2 | 100 (57) | 5.3 (3.0) | 18 (10) | — | — | — | 53 (30) | — | — |
| Example 3 | 100 (57) | 5.3 (3.0) | — | 18 (10) | — | — | 53 (30) | — | — |
| Example 4 | 100 (60.5) | 7.4 (4.5) | — | — | 8.3 (5.0) | — | 50 (30) | — | — |
| Compaarative Example 7 | 100 (57) | 5.3 (3.0) | — | — | — | 18 (10) | 53 (30) | — | — |
| Compaarative Example 8 | 100 (55) | — | — | — | — | — | 55 (30) | 18 (10) | 9 (5) |

TABLE 2

| | Oxygen index | CTI (V) | Tensile strength (MPa) | Bending strength (MPa) | DTUL (° C.) |
|---|---|---|---|---|---|
| Comparative Example 1 | 20.0 | 450 | 140 | 210 | ≧200 |
| Comparative Example 2 | 25.0 | 425 | 145 | 215 | ≧200 |
| Comparative Example 3 | 26.0 | 350 | 145 | 210 | ≧200 |
| Comparative Example 4 | 27.5 | 325 | 140 | 210 | ≧200 |
| Comparative Example 5 | 23.5 | 500 | 100 | 155 | ≧200 |
| Comparative Example 6 | 21.5 | 375 | 110 | 165 | ≧200 |
| Example 1 | 27.5 | 550 | 120 | 175 | ≧200 |
| Example 2 | 28.0 | 575 | 120 | 170 | ≧200 |
| Example 3 | 31.5 | ≧600 | 125 | 190 | ≧200 |
| Example 4 | 28.0 | 550 | 125 | 180 | ≧200 |
| Comparative Example 7 | 26.5 | 425 | 120 | 170 | ≧200 |
| Comparative Example 8 | 30.5 | 200 | 135 | 200 | ≧200 |

As shown by the results in Table 2, in the case of making the PBT of flame retardant by red phosphorus, its tracking resistance property did not show a high value (Comparative examples 2 to 4). Also, by only blending zinc stannate or zinc borate with the PBT, a sufficient flame retardant property was not developed (Comparative examples 5 to 6). However, by blending red phosphorus, zinc stannate or zinc borate with PBT, the flame retardant property and tracking resistance were improved by a synergistic effect which was not expected from the blending effects of each of the single blendings, and also compositions excellent in heat resistance (DTUL) and mechanical characteristics were obtained (Examples 1 to 3). Also, although the similar effects were observed in the case of using zinc oxide, such effects were small in using aluminum borate, thus such effects were understood as the specific effect of the compound containing zinc (Examples 4 and Comparative example 7). And the above effects were markedly excellent as compared with the case of making the composition of flame retardant by using brominated polycarbonate and antimony trioxide (Comparative example 8).

Example 5 and Comparative Example 9

Pellets for molding were obtained by mixing a polyethylene terephthalate (PET, made by Teijin Limited) dried at 130° C. for 8 hours with a hot air and having intrinsic viscosity value of 0.71, a glass fiber (a chopped strand having a fiber diameter of 13 μm and fiber length of 3 mm, made by Nippon Electric Glass Co., Ltd.), red phosphorus (essentially spherical red phosphorus powder of which surface is coated by a phenol resin and aluminum hydroxide, obtained by a conversion treatment method of yellow phosphorus, commercial name; NOVAEXCEL 140, made by Rinkakgaku Kogyo Co., Ltd.), a zinc borate (commercial name; FIREBREAK290, made by BORAX, Co. Ltd., in the U.S.), a brominated polystyrene (commercial name; PYRO-CHEK68PB, made by Ferro Co., Ltd.) and antimony trioxide (commercial name; PATOX-M, Nihon Seiko Co., Ltd.), a talc (commercial name, PKNN, made by Hayashi Chemical Co., Ltd.), a bisphenol A type epoxy (commercial name, EPIKOTE 828, made by Yuka Shell Epoxy, K.K.), and a copolymerized polyester (a polytetramethylene terephthalate-polytetramethyleneoxide copolymer polyester, commercial name, TR-EL-1, made by Teijin Limited) in ratios described in Table 3 in a tumbler uniformly in advance, then melting and kneading by using a bi-axial extruder having a screw diameter of each 44 mm with a vent, under a vacuum at a cylinder temperature of 280° C., at a number of a screw rotation of 120 r.p.m, and an ejection amount of 40 kg/hour, and cooling and cutting the thread ejected from a die.

Then, by using the pellets, molded products for measuring various characteristics were molded by using an injection molder having an injection volume of 5 ounce under a condition of a cylinder temperature of 280° C., a mold temperature of 130° C., an injection pressure of 80 MPa, a cooling time of 15 seconds, and a total molding cycle of 45 seconds.

By using these molded products, various characteristics were measured. The results of them are shown in Table 4. Provided that, each of the compositions shown in Table 3 is expressed by parts weight, and the ratios to the total weight of the composition in weight % are also described in parentheses.

TABLE 3

| | (A) PET | (B) Red phosphorus | (C) Zinc borate | (D) Glass fiber | Talc | Bisphenol A type epoxy | Co-polyester | Brominated poly-styrene | Antimony trioxide |
|---|---|---|---|---|---|---|---|---|---|
| Example 5 | 100 (50.2) | 6 (3) | 20 (10) | 60 (30) | 0 (5) | 0.6 (0.3) | 3 (1.5) | — | — |
| Comparative Example 9 | 100 (50.2) | — | — | 60 (30) | 10 (5) | 0.6 (0.3) | 3 (1.5) | 20 (10) | 6 (3) |

TABLE 4

| | Oxygen index | CTI (V) | Tensile strength (MPa) | Bending strength (MPa) | DTUL (° C.) |
|---|---|---|---|---|---|
| Example 5 | 32.0 | 375 | 123 | 171 | ≧240 |
| Comparative Example 9 | 33.5 | 225 | 140 | 195 | ≧240 |

From the results in Table 4, the similar effects were exhibited in the case of using a polyethylene terephthalate as the aromatic polyester (Example 5 and comparative example 9).

Effect of the Invention

In accordance with the present invention, it is possible to obtain a resin composition excellent in flame retardant property and electric insulation property expressed by a tracking resistance. The resin composition in the present invention can be used suitably for electric/electronic parts.

What is claimed is:

1. A resin composition comprising (A) an aromatic polyester of 100 parts weight, (B) red phosphorus, (C) hydrated zinc borate that is represented by $2ZnO.3B_2O_3.3.5H_2O$ and/or zinc stannate, of 2 to 50 parts weight of 2 to 50 parts weight and (D) an inorganic filler, in which the total of the components (C) and (D) is 25 to 60 weight percent based on the total amount of the composition.

2. A resin composition according to claim 1, wherein the aromatic polyester (A) is a polytetramethylene terephthalate.

3. A resin composition according to claim 1, wherein the aromatic polyester (A) is a polyethylene terephthalate.

4. A resin composition according to claim 1, wherein the aromatic polyester (A) is a polytetramethylene-2,6-naphthalene dicarboxylate.

5. A resin composition according to claim 1, wherein the red phosphorus is a coated red phosphorus powder having a coating of a cured material of a curable resin.

6. A resin composition according to claim 5, wherein the coated red phosphorus powder is composed essentially of a spherical red phosphorus having a cured resin coating, directly obtained by a conversion treatment method of yellow phosphorus, not requiring the pulverization process thereof and without having crushed surfaces.

7. A resin composition according to claim 1, wherein the inorganic filler (D) is a fibrous inorganic filler.

* * * * *